UNITED STATES PATENT OFFICE.

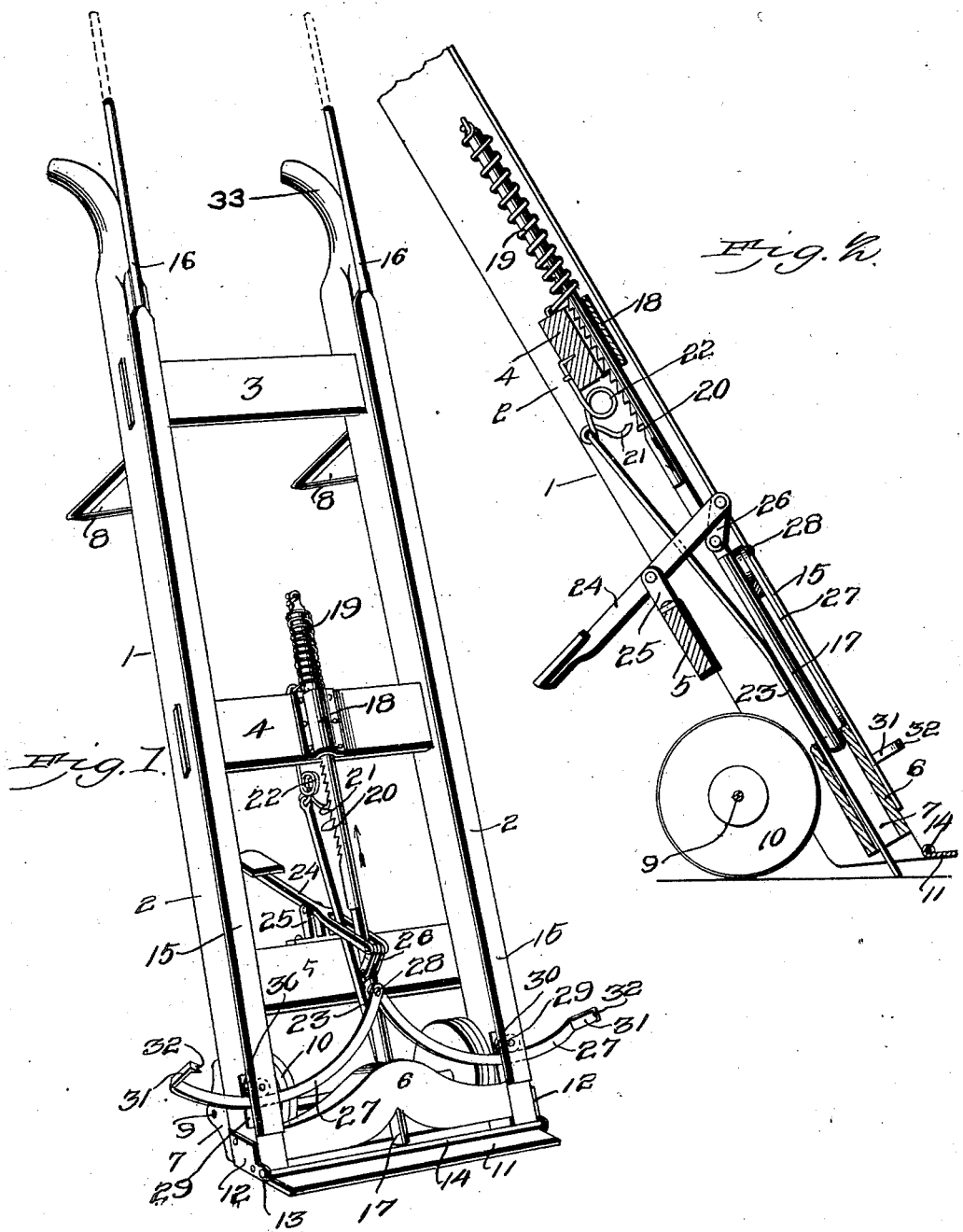

WILLIAM GRANT TOWER, OF CORONA, CALIFORNIA, ASSIGNOR OF ONE-HALF TO GEORGE M. D. SOUTHWORTH, OF CORONA, CALIFORNIA.

HAND-TRUCK.

SPECIFICATION forming part of Letters Patent No. 713,719, dated November 18, 1902.

Application filed February 17, 1902. Serial No. 94,514. (No model.)

*To all whom it may concern:*

Be it known that I, WILLIAM GRANT TOWER, a citizen of the United States, residing at Corona, in the county of Riverside and State of California, have invented a new and useful Hand-Truck, of which the following is a specification.

My invention is an improved hand-truck adapted for use in moving packages, barrels, and the like; and it consists in the peculiar construction and combination of devices hereinafter fully set forth and claimed.

The object of my invention is to provide improved means for gripping one of the boxes or other articles loaded on the truck to prevent the same from slipping off while the truck is in motion.

A further object of my invention is to provide improved releasing means for detaching the gripping mechanism from the box, package, or other article on the truck.

In the accompanying drawings, Figure 1 is a perspective view of a hand-truck embodying my improvements. Fig. 2 is a central sectional view of the same.

The frame 1 of the truck may be of any suitable construction. As shown in the drawings, the same comprises the side bars 2, which form the skids, cross-bars 3, 4, 5, and 6, which connect the side bars together, bearing-blocks 7 under the side bars at the front ends thereof, and supporting-legs 8 under the side bars near their rear ends to support the truck in a horizontal position. The axle-shaft 9 is journaled in the bearings 7, and the supporting-wheels 10 are on the axle-shaft.

The nose-piece 11 is pivoted to the front end of the truck-frame, so that the same may be extended outwardly therefrom to engage and bear under a box or other package, and the said nose-piece may, if desirable, be folded against the outer sides of the side bars 2, where the same will be out of the way if it is not to be used. Within the scope of my invention the nose-piece may be pivoted in any suitable manner. I show plates 12, which are secured to the outer sides of the bars 2, at the front ends thereof, by bolts or screws and which are provided with ears 13, having openings to receive projecting trunnions 14 or a pivot-rod, with which the nose-piece is provided.

On the upper sides of the bars 2 are longitudinal wear-plates 15. Under the same in the upper sides of side bars 2 are longitudinal grooves, in which are fitted longitudinally-movable rods or bars 16. The upper or rear ends of said rods or bars project beyond the rear ends of the side bars, and by moving said rods or bars 16 longitudinally their rear ends may be caused to project beyond the rear or upper ends of the side bars 2 to any desired extent. Said projecting rods 16 enable a load of a length exceeding that of the truck-frame to be placed thereon.

A longitudinally-movable rod 17 operates in suitable guides 18, with which the cross-bars 4 and 6 are provided. A spring 19, which is here shown as a coiled retractile spring, normally moves the rod 17 outwardly. The said rod is provided on one side with a series of ratchet-teeth 20. A spring-pressed dog or pawl 21 normally engages one of said ratchet-teeth to prevent the outward movement of the rod 17 by the action of the spring 19. In the embodiment of my invention here shown the dog or pawl 21 is formed integrally with the spring, which normally keeps it in engagement with the toothed rod 17. The said spring is shown as provided with a coil 22, which forms the pivot of the said dog or pawl; but I do not limit myself in this particular, and within the scope of my invention the pawl may be of any suitable construction, pivoted by any suitable means, and any form of spring may be employed to normally engage the pawl with the toothed rod. A release-rod 23 is attached to the dog or pawl 21, and its outer portion operates in a guide in the cross-bar 6 and normally projects beyond the front side thereof. A pedal-lever 24 is fulcrumed to a bearing 25, which is secured to the cross-bar 5. One end of the said pedal-lever is connected to the longitudinally-movable rod 17 by a link 26. Within the scope of my invention any other suitable means may be employed to connect the pedal-lever to the rod 17, and I do not limit myself in this particular.

A pair of gripping-arms 27, which are of arcuate form, have their inner ends pivotally connected to the longitudinally-movable rod 17, as at 28. The said gripping-arms operate in guideways 29 in the sides of the truck-frame, and preferably antifriction-rollers 30 are mounted in the said guideways to bear on said gripping-arms. The length of the latter is such that their outer ends when the rod 17 is moved outwardly project laterally beyond the sides of the truck-frame. The outer ends of said gripping-arms are upturned, as at 31, and provided with gripping-heads 32, adapted to engage the sides of boxes or other packing vessels on the truck-frame.

The operation of my improved hand-truck is as follows: When the rear end of the truck is raised by its handles 33 to engage the nose-piece under a box or other packing vessel, the release-rod 23, the front end of which normally projects beyond the front end of the truck-frame, bears against the floor or other surface on which the truck is operated and is moved rearwardly, thereby tripping the dog or pawl 21 from the toothed rod 17. The spring 19 thereupon moves the said rod 17 outwardly, causing the gripping-arms 27 to be laterally extended, so that their gripping-heads are on opposite sides of the box or package. The operator by pressing one foot on the pedal-lever 24 moves the rod 17 inwardly against the tension of the spring 19, thereby causing the outer ends or heads of the gripping-arms to be drawn inwardly and clamped against the sides of the box or packing to secure the same on the truck-frame. At the same time the operator by lowering the rear end of the truck-frame raises the front end thereof, hence disengaging the release-rod 23 from the floor or surface and causing the spring-pressed pawl or dog to reëngage the toothed rod 17 to lock the latter against longitudinal movement, and hence the box or package is retained on the truck. It will be understood that a number of boxes or packages which are piled one upon another may be loaded simultaneously on the truck-frame and unloaded therefrom. It will be also understood that prior to unloading the boxes or packages from the truck the release-rod will trip the dog from the rod 17 as the truck is turned to its elevated position to lower the nose-piece to the ground, and hence the gripping-arms will be simultaneously and automatically disengaged from the load.

Since the gripping-arms are operated manually by the lever 24, the operator by exercising reasonable care in pressing on the said lever 24 with his foot can avoid compressing the box or other article on the truck with such force by the gripping-arms as to crush in the heads or sides thereof, the pressure of the gripping-arms on the box or other article being entirely dependent upon the pressure or force applied to the lever 24.

I do not desire to limit myself to the precise construction and combination of devices herein shown and described, as it is evident that modifications may be made therein without departing from the spirit of my invention.

Having thus described my invention, I claim—

1. A hand-truck having a longitudinally-movable rod, means to lock said rod against movement, a lever to operate the rod, longitudinally-slidable gripping devices, having their outer ends extended beyond the sides of the truck-frame and their inner ends connected to the longitudinally-movable rod, and guides for said gripping devices, substantially as described.

2. A hand-truck having guides in the sides of the frame, a longitudinally-movable rod, a lever to operate the same, means to directly engage the rod and lock the same against movement and longitudinally-slidable gripping devices extending through the guides in the sides of the frame and connected to the longitudinally-movable rod for operation thereby, substantially as described.

3. A hand-truck having a longitudinally-movable rod, a spring to normally move said rod outwardly, a detent including a release-rod projecting normally beyond the front end of the truck-frame to lock the longitudinally-movable rod against movement by the spring, a lever to move said rod against the tension of said spring, and gripping-arms connected to and operated by said rod, said gripping-arms being extended laterally beyond the sides of the truck-frame, by the action of the rod and spring when the former is released, substantially as described.

4. In a hand-truck, the combination of gripping devices to engage the sides of an article loaded on the truck, a spring-pressed element to normally extend said gripping devices, a detent to lock said spring-pressed element against movement by its spring, a trip element to release said detent, said trip element projecting beyond the front end of the truck, for the purpose set forth, and a lever to actuate said spring-pressed element against the tension of its spring and thereby retract the gripping devices, substantially as described.

5. A hand-truck having side bars provided at their rear ends with fixed handles or grips, and independent longitudinally-extensible bars mounted to slide on the side bars and adapted for rearward extension above and beyond the handles or grips to support a load of a length in excess of the truck-frame.

6. A hand-truck having a longitudinally-movable rod, means for locking said rod against movement, longitudinally-slidable gripping devices having their outer ends extended beyond the sides of the truck-frame and their inner ends connected to the longitudinally-movable rod, and guides for said gripping devices.

7. In a hand-truck, the combination of gripping devices for engaging the sides of an article loaded on the truck, means for holding said gripping devices in adjusted position, and a trip projected beyond the forward end of the truck for contact with the surface traversed by the truck and connected with said holding means for releasing the grip devices therefrom.

8. In a hand-truck, the combination of gripping devices for engaging the sides of an article loaded on the truck, means for holding said gripping devices in adjusted position, a trip connected with said holding means for releasing said gripping devices therefrom, and means for retracting said gripping devices to cause them to engage the article to be moved.

In testimony that I claim the foregoing as my own I have hereto affixed my signature in the presence of two witnesses.

WILLIAM GRANT TOWER.

Witnesses:
S. M. HILL,
M. B. HUFF.